US012641460B2

(12) United States Patent
Cui et al.

(10) Patent No.: US 12,641,460 B2
(45) Date of Patent: May 26, 2026

(54) RRM MEASUREMENT IN 5G NEW RADIO FR1 DUAL CONNECTIVITY

(71) Applicant: Apple Inc., Cupertino, CA (US)

(72) Inventors: Jie Cui, San Jose, CA (US); Yang Tang, San Jose, CA (US); Qiming Li, Beijing (CN); Dawei Zhang, Saratoga, CA (US); Hong He, San Jose, CA (US); Huaning Niu, San Jose, CA (US); Manasa Raghavan, Sunnyvale, CA (US); Xiang Chen, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/675,312

(22) Filed: May 28, 2024

(65) Prior Publication Data

US 2024/0314602 A1　　Sep. 19, 2024

Related U.S. Application Data

(63) Continuation of application No. 17/593,233, filed as application No. PCT/CN2021/071503 on Jan. 13, 2021, now Pat. No. 12,015,942.

(51) Int. Cl.
| | |
|---|---|
| *H04W 72/04* | (2023.01) |
| *H04W 24/08* | (2009.01) |
| *H04W 76/15* | (2018.01) |

(52) U.S. Cl.
CPC ........... *H04W 24/08* (2013.01); *H04W 76/15* (2018.02)

(58) Field of Classification Search
CPC . H04W 24/08; H04W 76/15; H04W 36/0088; H04W 24/10
See application file for complete search history.

(56) References Cited

U.S. PATENT DOCUMENTS

| | | | |
|---|---|---|---|
| 2013/0100841 A1* | 4/2013 | Liang ..................... | H04L 5/001 |
| | | | 370/252 |
| 2019/0274146 A1 | 9/2019 | Tang et al. | |

(Continued)

FOREIGN PATENT DOCUMENTS

| | | |
|---|---|---|
| WO | 2020/089513 | 5/2020 |
| WO | 2020/200240 | 10/2020 |

OTHER PUBLICATIONS

Media Tek inc., R4-2014623, Introduction of CSSF requirements for CSI-RS based L3 measurement, 3GPP TSG-RAN WG4 Meeting #97-e, Electronic Meeting, Nov. 2-13, 2020 (Year: 2020).*

(Continued)

*Primary Examiner* — Mahbubul Bar Chowdhury
(74) *Attorney, Agent, or Firm* — Fay Kaplun & Marcin, LLP

(57) ABSTRACT

A user equipment (UE) is configured to simultaneously connect to a primary cell (PCell) and a primary secondary cell (PSCell) of a wireless network, wherein a primary component carrier (PCC) of the PCell and a primary secondary component carrier (PSCC) of the PSCell are both in frequency range 1 (FR1). The UE receives a PCC measurement object (MO) configuration, a PSCC MO configuration, and an inter-frequency MO with no measurement gap configuration, determines a PCC MO carrier specific scaling factor (CSSF), a PSCC MO CSSF, and an inter-frequency MO with no measurement gap CSSF and applies each respective CSSF to a measurement period corresponding to each of the PCC MO, the PSCC MO, and the inter-frequency MO with no measurement gap to determine a scaled measurement period corresponding to each of the PCC MO, the PSCC MO, and the inter-frequency MO with no measurement gap.

20 Claims, 7 Drawing Sheets

300

(56)  References Cited

U.S. PATENT DOCUMENTS

| | | | |
|---|---|---|---|
| 2023/0030224 A1* | 2/2023 | Wang .................... | H04W 24/08 |
| 2024/0007845 A1* | 1/2024 | Tang .................... | H04W 16/28 |

OTHER PUBLICATIONS

Huawei, R4-2015491 CR on CSSF definition for CSI-RS based measurement, 3GPP TSG-RAN4 Meeting #97-e, Electronic Meeting, Nov. 2-13, 2020 (Year: 2020).*

* cited by examiner

UE 110

300

Receive NR-DC CC configuration    305

Receive MO configuration for all CCs    310

Determine CSSF based on MO configuration    315

Perform measurements on MOs using CSSF    320

400

| Scenario | $CSSF_{outside\_gap,i}$ for FR1 PCC | $CSSF_{outside\_gap,i}$ for FR1 SCC | $CSSF_{outside\_gap,i}$ for FR1 PSCC | $CSSF_{outside\_gap,i}$ for FR2 PSCC | $CSSF_{outside\_gap,i}$ for FR2 SCC where neighbor cell measurement is not required | $CSSF_{outside\_gap,i}$ for inter-frequency MO with no measurement gap |
|---|---|---|---|---|---|---|
| FR1 + FR1 NR-DC with FR1 SCC(FR1 PCell and FR1 PSCell and FR1 SCell) | $1 + N_{PCC\_CSIRS}$ | $2 \times (N_{SCC\_SSB} + Y + 2 \times N_{SrC\_CSIRS})$ | $2 \times (1 + N_{PSCC\_CSIRS})$ (Note1) | NA | NA | $2 \times (N_{SCC\_SSB} + Y + 2 \times N_{SCC\_CSIRS})$ |

Note 1: $CSSF_{outside\_gap,i}$ =1 if no SCell is configured and no inter-frequency MO without gap.

Note 2: Y is the number of configured inter-frequency SSB based frequency layers without MG that are being measured outside of MG Note 3: $N_{PCC\_CSIRS}$ =1 if PCC is with either both SSB and CSI-RS based L3 configured or only CSI-RS based L3 measurement configured; otherwise, $N_{PCC}$ =0.

Note 4: $N_{PSCC\_CSIRS}$ =1 if PSCC is with either both SSB and CSI-RS based L3 configured or only CSI-RS based L3 measurement configured; otherwise, $N_{PSCC}$ =0.

Note 5: $N_{SrC\_CSIRS}$ =Number of configured SCell(s) with either both SSB and CSI-RS based L3 measurement configured or only CSI-RS based L3 measurement configured Note 6: $N_{SCC\_SSB}$ =Number of configured SCell(s) with only SSB based L3 measurement configured

| Scenario | $CSSF_{outside\_gap,i}$ for FR1 PCC | $CSSF_{outside\_gap,i}$ for FR1 SCC | $CSSF_{outside\_gap,i}$ for FR1 PSCC | $CSSF_{outside\_gap,i}$ for FR2 PSCC | $CSSF_{outside\_gap,i}$ for FR2 SCC where neighbor cell measurement is required | $CSSF_{outside\_gap,i}$ for FR2 SCC where neighbor cell measurement is not required | $CSSF_{outside\_gap,i}$ for inter-frequency MO with no measurement gap |
|---|---|---|---|---|---|---|---|
| FR1 + FR1 NR-DC with FR2 SCC(FR1 PCell and FR2 PScell and FR2 Scell) | $1+N_{PCC\_CSIRS}$ | NA | $2\times(1+N_{PSCC\_CSIRS})$ (Note 1) | NA | $4\times(N_{SCC\_SSB\_FR2\_NCM} + 2\times N_{SCC\_CSIRS\_FR2\_NCM})$ | $4\times(N_{SCC\_SSB} = N_{SCC\_SSB\_FR2\_NCM}) + Y + 2\times(N_{SCC\_CSIRS} = N_{SCC\_CSIRS\_FR2\_NCM})$ | $4\times((N_{SCC\_SSB} = N_{SCC\_SSB\_FR2\_NCM}) + Y + 2\times(N_{SCC\_CSIRS} = N_{SCC\_CSIRS\_FR2\_NCM}))$ (Note 9) |

Note 1: $CSSF_{outside\_gap,i}$ =1 if no SCell is configured and no inter-frequency MO without gap.

Note 2: Y is the number of configured inter-frequency SSB based frequency layers without MG that are being measured outside of MG Note 3: $N_{PCC\_CSIRS}$=1 if PCC is with either both SSB and CSI-RS based L3 configured or only CSI-RS based L3 measurement configured; otherwise, $N_{PCC}$ =0.

Note 4: $N_{PSCC\_CSIRS}$=1 if PSCC is with either both SSB and CSI-RS based L3 configured or only CSI-RS based L3 measurement configured; otherwise, $N_{PSCC}$ =0.

Note 5: $N_{SCC\_CSIRS}$=Number of configured SCell(s) with either both SSB and CSI-RS based L3 measurement configured or only CSI-RS based L3 measurement configured Note 6: $N_{SCC\_CSIRS\_FR2\_NCM}$= number of FR2 SCCs where 'neighbor cell measurement is required and is with either both SSB and CSI-RS configured or only CSI-RS measurement configured'. Each FR2 band can only pick one of this kind of SCC for the CSSF calculation.

Note 7: $N_{SCC\_SSB\_FR2\_NCM}$= number of configured FR2 SCC(s) where 'neighbor cell measurement is required and is with only SSB based L3 measurement configured'. Each FR2 band can only pick one of this kind of SCC for the CSSF calculation.

Note 8: $N_{SCC\_SSB}$=Number of configured SCell(s) with only SSB based L3 measurement configured Note 9: If no SCC is configured but inter-frequency MOs without MG are configured on PCC and/or PSCC, the inter-frequency MO without MG can have the 50% of the 2nd searcher. i.e., scaling factor= 2*Y

| Scenario | $CSSF_{outside\_gap,i}$ for FR1 PCC | $CSSF_{outside\_gap,i}$ for FR1 SCC | $CSSF_{outside\_gap,i}$ for FR1 PSCC | $CSSF_{outside\_gap,i}$ for FR2 PSCC | $CSSF_{outside\_gap,i}$ for FR2 SCC where neighbor cell measurement is required | $CSSF_{outside\_gap,i}$ for FR2 SCC where neighbor cell measurement is not required | $CSSF_{outside\_gap,i}$ for inter-frequency MO with no measurement gap |
|---|---|---|---|---|---|---|---|
| FR1 + FR1 NR-DC with FR2 SCC(FR1 PCell and FR2 PScell and FR1 Scell and FR2 Scell) | $1+N_{PCC\_CSIRS}$ | $4\times((N_{SCC\_SSB\_FR2\_NCM}) + Y + 2\times(N_{SCC\_CSIRS\_FR2\_NCM}))$ | $2\times(1+ N_{PSCC\_CSIRS})$ (Note 1) | NA | $4\times(N_{SCC\_SSB\_FR2\_NCM} + 2\times N_{SCC\_CSIRS\_FR2\_NCM})$ | $4\times((N_{SCC\_SSB} - N_{SCC\_SSB\_FR2\_NCM}) + Y + 2\times(N_{SCC\_CSIRS} - N_{SCC\_CSIRS\_FR2\_NCM}))$ | $4\times((N_{SCC\_SSB} - N_{SCC\_SSB\_FR2\_NCM}) + Y + 2\times(N_{SCC\_CSIRS} - N_{SCC\_CSIRS\_FR2\_NCM}))$ (Note 9) |

Note 1: $CSSF_{outside\_gap,i}$ =1 if no SCell is configured and no inter-frequency MO without gap.

Note 2: Y is the number of configured inter-frequency SSB based frequency layers without MG that are being measured outside of MG Note 3: $N_{PCC\_CSIRS}$=1 if PCC is with either both SSB and CSI-RS based L3 measurement configured or only CSI-RS based L3 measurement configured; otherwise, $N_{PCC}$ =0.

Note 4: $N_{PSCC\_CSIRS}$=1 if PSCC is with either both SSB and CSI-RS based L3 configured or only CSI-RS based L3 measurement configured; otherwise, $N_{PSCC}$ =0.

Note 5: $N_{SCC\_CSIRS}$=Number of configured SCell(s) with either both SSB and CSI-RS based L3 measurement configured or only CSI-RS based L3 measurement configured Note 6: $N_{SCC\_CSIRS\_FR2\_NCM}$= number of FR2 SCCs where 'neighbor cell measurement is required and is with either both SSB and CSI-RS configured or only CSI-RS measurement configured'. Each FR2 band can only pick one of this kind of SCC for the CSSF calculation.

Note 7: $N_{SCC\_SSB\_FR2\_NCM}$= number of configured FR2 SCC(s) where 'neighbor cell measurement is required and is with only SSB based L3 measurement configured'. Each FR2 band can only pick one of this kind of SCC for the CSSF calculation.

Note 8: $N_{SCC\_SSB}$=Number of configured SCell(s) with only SSB based L3 measurement configured. Here the SCC includes both FR1 and FR2 SCCs.

Note 9: If no SCC is configured but inter-frequency MOs without MG are configured on PCC and/or PSCC, the inter-frequency MO without MG can have the 50% of the 2nd searcher, i.e., scaling factor= $2\times Y$

Fig. 6

RRM MEASUREMENT IN 5G NEW RADIO FR1 DUAL CONNECTIVITY

BACKGROUND

Dual connectivity (DC) has been used to increase data throughput at a user equipment (UE). In DC, the UE can transmit and receive data on multiple component carriers from two cell groups to increase the throughput of the UE. In new radio 5G new radio (NR) DC, one g-NodeB (gNB) serves as a primary node (PN) and another gNB serves a secondary node (SN).

Typically, in NR-DC, component carriers of the PN are in a first frequency range (FR1) and component carriers of the SN are in a second frequency range (FR2). Typically, the FR1 frequency range is below 7.225 GHz and the FR2 frequency range is in the mmWave frequency above 24.250 GHZ. When communicating with the 5G network, the UE may be configured with one or more bandwidth parts (BWPs) of FR1 and/or FR2 on which to communicate.

SUMMARY

Some exemplary embodiments relate to include a user equipment (UE) having a transceiver and a processor. The transceiver is configured to simultaneously connect to a primary cell (PCell) and a primary secondary cell (PSCell) of a wireless network, wherein a primary component carrier (PCC) of the PCell and a primary secondary component carrier (PSCC) of the PSCell are both in frequency range 1 (FR1). The processor is communicatively coupled to the transceiver and configured to perform operations. The operations include receiving a PCC measurement object (MO) configuration, a PSCC MO configuration, and an inter-frequency MO with no measurement gap configuration, determining a PCC MO carrier specific scaling factor (CSSF), a PSCC MO CSSF, and an inter-frequency MO with no measurement gap CSSF and applying each respective CSSF to a measurement period corresponding to each of the PCC MO, the PSCC MO, and the inter-frequency MO with no measurement gap to determine a scaled measurement period corresponding to each of the PCC MO, the PSCC MO, and the inter-frequency MO with no measurement gap.

Other exemplary embodiments relate to a processor of a user equipment (UE) configured to perform operations. The operations include receiving a primary component carrier (PCC) measurement object (MO) configuration, a primary secondary component carrier (PSCC) MO configuration, and an inter-frequency MO with no measurement gap configuration, determining a PCC MO carrier specific scaling factor (CSSF), a PSCC MO CSSF, and an inter-frequency MO with no measurement gap CSSF and applying each respective CSSF to a measurement period corresponding to each of the PCC MO, the PSCC MO, and the inter-frequency MO with no measurement gap to determine a scaled measurement period corresponding to each of the PCC MO, the PSCC MO, and the inter-frequency MO with no measurement gap.

Still further exemplary embodiments are related to a processor of a user equipment (UE) configured to perform operations. The operations include receiving a capabilities enquiry as part of a radio resource configuration (RRC) request from a base station, wherein the RRC request is configured to establish a simultaneous connection to a primary cell (PCell) and a primary secondary cell (PSCell) of a wireless network, and wherein a primary component carriers (PCC) of the PCell and a primary secondary component carrier (PSCC) of the PSCell are both in frequency range 1 (FR1) and transmitting a user equipment (UE) capability to the base station, wherein the UE capability indicates whether a UE supports mixed numerology between different cell groups.

BRIEF DESCRIPTION OF THE DRAWINGS

FIG. 4 shows a table for determining a carrier specific scaling factor (CSSF) according to various exemplary embodiments.

FIG. 5 shows a table for determining a CSSF according to various exemplary embodiments.

FIG. 6 shows a table for determining a CSSF according to various exemplary embodiments.

DETAILED DESCRIPTION

Figure 1:
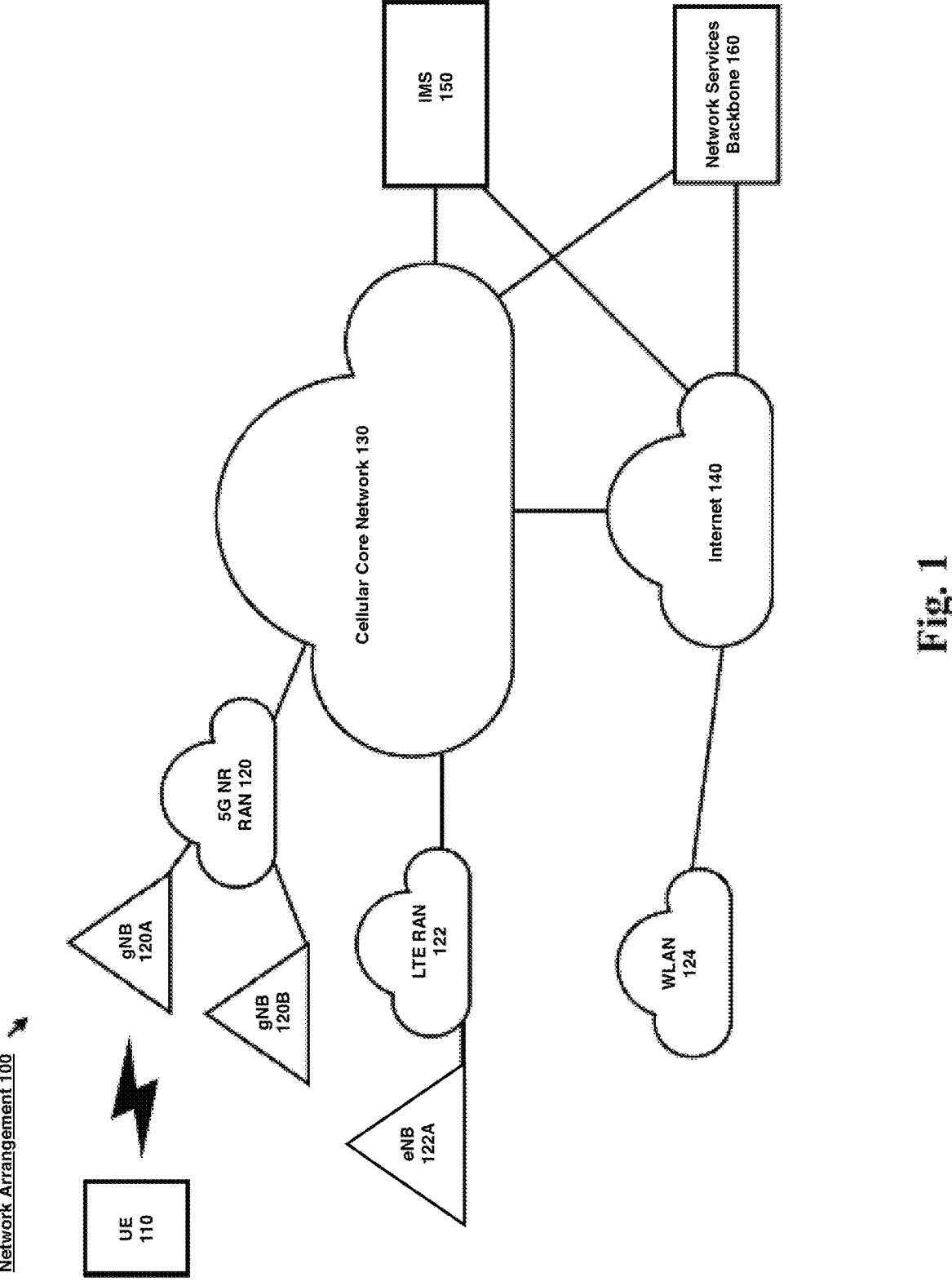
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to radio resource management (RRM) by a user equipment (UE) in a new radio (NR) dual connectivity (DC) environment.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to a network that includes 5G new radio NR radio access technology (RAT). However, in some embodiments, the network may also include a Long-Term Evolution (LTE) RAT even though the following description will focus primarily on 5G NR RAT.

In NR-DC, more than one g-NodeB (gNB) of the 5G wireless network may configure a primary cell (PCell) and one or more secondary cells (SCells) for communication between the UE and the 5G wireless network. Typically, this has been done with the component carriers (CCs) of the primary cell group (PCell CC (PCC) and PSCell CC (PSCC)) in FR1 and with the CCs of the secondary cell group (SCell CC (SCC)) in FR2. Because the UE only has a limited number of searchers (e.g., radiofrequency and baseband processing resources), the UE cannot simultaneously perform measurements on measurement objects (MOs) of all configured CCs during every monitoring occasion. These MOs may include synchronization signal block (SSBs), channel state information reference signals (CSI-RS), etc. Current 3GPP standards specify how the UE should perform measurements on configured MOs when the PCC is in FR1 and the PSCC is in FR2. However, the current standards do not specify how the UE should perform these measurements when both the PCC and the PSCC are in FR1.

According to some exemplary embodiments, the UE is configured to utilize a carrier specific scaling factor (CSSF) to determine measurement delay requirements for performing measurements on configured MOs corresponding to each of a plurality of cells when more than one of the CCs are in FR1. In some cases, the UE has two searchers. One searcher is dedicated to measuring MOs of the PCC while the second searcher is divided among measurements of MOs of the PSCC, any configured SCCs, and inter-frequency MOs with no measurement gap. As such, the CSSFs provide a manner of managing the limited number of searchers when measuring contemporaneous MOs when the PCC and PSCC are both in FR1.

Another issue that arises is that current 3GPP standards do not specify whether a UE is required to support mixed numerology for NR-DC when both the PCC and the PSCC are in FR1. The standards also do not provide a means for the UE to provide its capability of supporting mixed numerology to the network if that support is not a requirement.

According to other exemplary embodiments, the UE reports its capability for supporting mixed numerology between cell groups (CGs) for NR-DC when both the PCC and the PSCC are in FR1.

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UE being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Thus, either simultaneously or alternatively, the UE 110 may connect to the 5G NR-RAN 120 via the gNBs 120A and 120B. In the present example, it may be considered that the gNB 120A is part of CG1 and the gNB 120B is part of CG2. Thus, in DC operation, the UE 110 may be simultaneously connected to gNB 120 A (CG1) and gNB 120B (CG2). Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120 and 122 the network arrangement 100 also includes a cellular core network 130. The cellular core network 130 may be considered to be the interconnected set of components that manages the operation and traffic of the cellular network.

Figure 2:
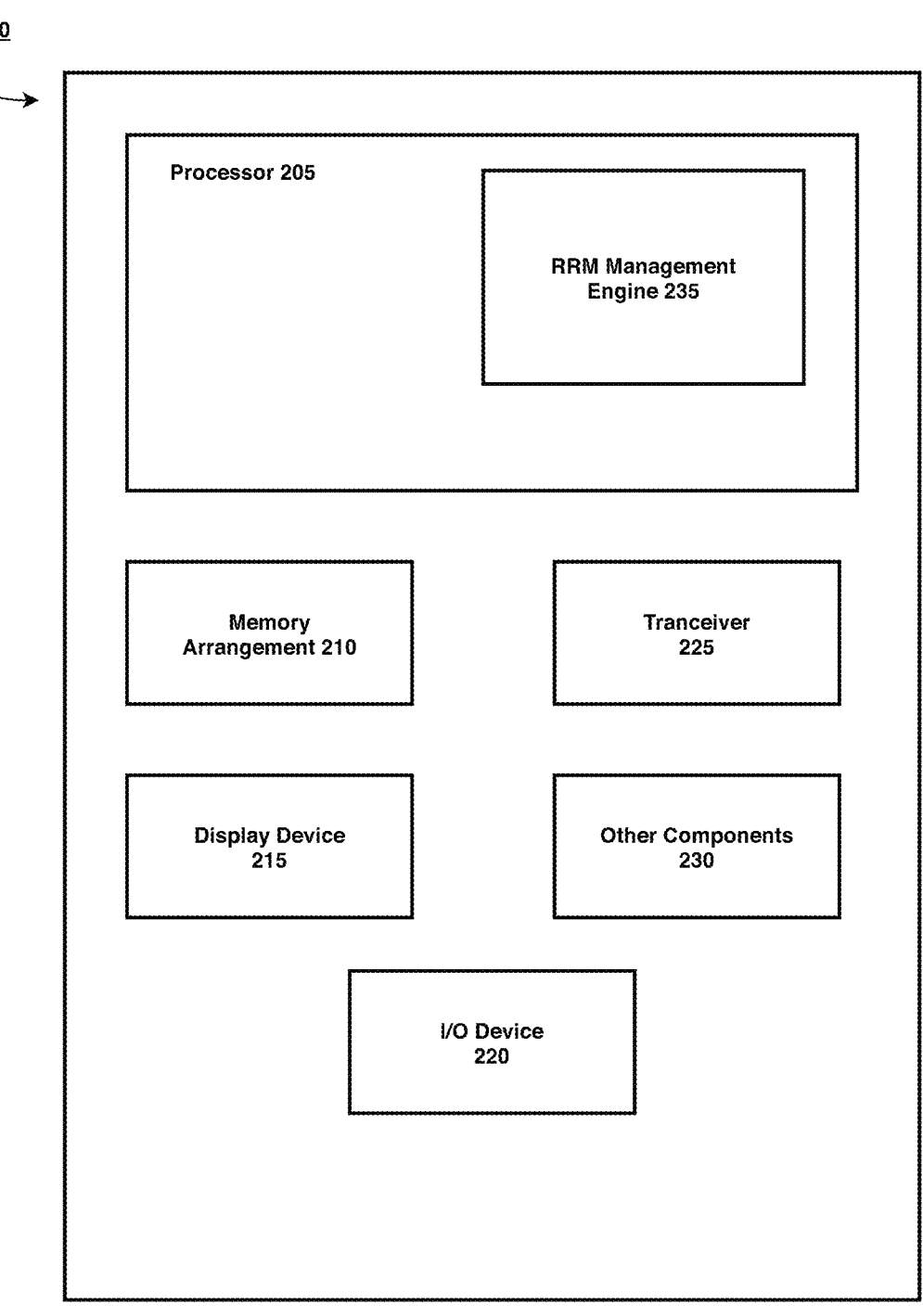
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a radio resource management (RRM) engine 235. The RRM engine 235 may perform various operations related to management of measurements of multiple configured MOs.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
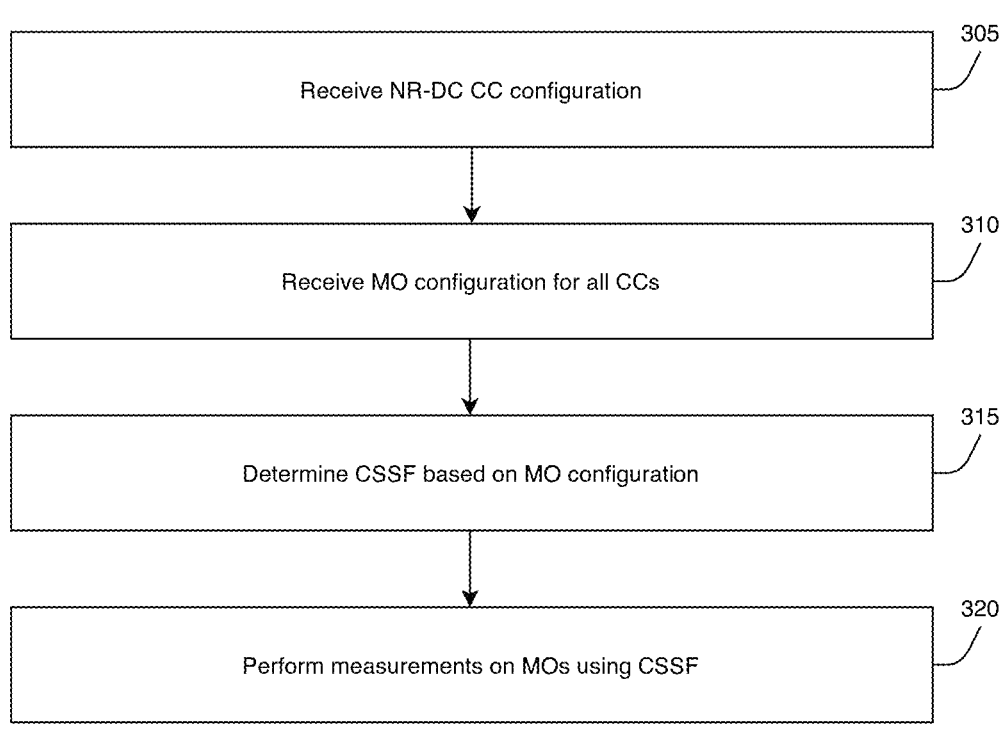
FIG. 3 shows a method of performing radio resource management (RRM) according to various exemplary embodiments.

FIG. 3 shows a method 300 of performing radio resource management (RRM) according to various exemplary embodiments. At 305, the UE 110 receives a CC configuration for NR-DC communications from a gNB (e.g., gNB 120A or 120B). In some embodiments, the CC configuration includes a PCC configuration and a PSCC configuration, both of which may be in FR1. In some embodiments, the CC configuration may additionally include SCCs from a primary cell group (PCG) and/or a secondary cell group (SCG). At 310, the UE 110 receives an MO configuration for the CCs configured at 305. As noted above, the UE 110 cannot measure all MOs corresponding to the configured CCs simultaneously. As such, at 315, the UE 110 determines a CSSF based on the MO configuration. This CSSF is determined based on Tables 400, 500, and 600 illustrated in FIGS. 4, 5, and 6, respectively. The CSSF dictates which CC's MO the UE 110 will measure at a given time. In other words, the CSSF is a scaling factor applied to the measurement period of the corresponding MO.

FIG. 4 shows a table 400 for determining a CSSF according to various exemplary embodiments. Table 400 assumes that the PCC, the PSCC, and the SCC (if any) are all in FR1 (below 7.225 GHz). The CSSF outside of the measurement gap for the FR1 PCC is equal to the number of MOs configured for the PCC, which is $1+N_{PCC\_CSIRS}$. As noted in Note 3, if no CSI-RS MO is configured for the PCC, then the CSSF outside of the measurement gap for the FR1 PCC is equal to 1. Otherwise, it is equal to 2 (1+1). The CSSF of the FR1 PCC is always at least one because, as noted above, one of the searchers of the UE 110 is always dedicated to measuring the MOs of the PCC. As also noted in Note 3, $N_{PCC\_CSIRS}$ is equal to 1 if either the SSB and CSI-RS based layer 3 (L3) measurements are both configured for the PCC or if only the CSI-RS based L3 measurement is configured for the PCC (since an SSB is needed to schedule the CSI-RS).

The second searcher of the UE 110 is dedicated to measurement of MOs configured for the PSCC half of the time. That is, half of the searcher is dedicated to the PSCC. The second half is shared between any SCCs and the inter-frequency MO with no measurement gap. As such, the second searcher will measure the PSCC MO at every other measurement opportunity. The CSSF outside of the measurement gap for the FR1 PSCC is equal to twice the number of MOs configured for the PSCC, which is $2\times(1+N_{PSCC\_CSIRS})$. Note 4 is similar to Note 3 discussed above with the exception that Note 4 pertains to $N_{PSCC\_CSIRS}$. Note 1 indicates that if no SCCs are configured and no inter-frequency MO without measurement gap is configured, then the CSSF outside of the measurement gap for the FR1 PSCC is equal to 1. This means that there are no other MOs that need to share the UE's second searcher with the PSCC. In this case, the first searcher is dedicated to the PCC MOs and the second searcher is used to measure PSCC MOS.

The CSSF outside of the measurement gap for configured SCCs in FR1 is defined as 2×(the number of MOs on all SCCs and on the inter-frequency layer without measurement gap) on any SCC, which is indicated as $2\times(2\times N_{SCC\_SSB}+Y+2\times N_{SCC\_CSIRS})$, where Y is the number of configured inter-frequency SSB-based frequency layers without measurement gap that are being measured outside of the measurement gap (as indicated in Note 2). The CSSF outside of the measurement gap for a configured inter-frequency MO with no measurement gap is defined as 2×(the number of MOs on all SCCs and on the inter-frequency layer without measurement gap) on any inter-frequency layer, which is also indicated as $2\times(2\times N_{SCC\_SSB}+Y+2\times N_{SCC\_CSIRS})$.

As indicated in Note 5, $N_{SCC\_CSIRS}$ is the number of configured SCCs with either (a) both SSB and CSI-RS based L3 measurements configured or (b) only a CSI-RS based L3 measurement configured. As indicated in Note 6, $N_{SCC\_SSB}$ is the number of configured SCCs with only an SSB based L3 measurement configured. Based on Table 400, one of the UE's searchers will always be dedicated to PCC MO measurements and the second of the UE's searchers will be shared between PSCC MO, SCC MO, and inter-frequency MO with no measurement gap measurements, with half of the second searcher dedicated to the PSCC MO measurements (every other monitoring occasion) (50% of the time) and the other half of the second searcher shared between the SCC MO measurement and the inter-frequency MO with no measurement gap measurement.

FIG. 5 shows a table 500 for determining a CSSF according to various exemplary embodiments. Table 500 assumes that the PCC and the PSCC are both in FR1 (below 7.225 GHZ) and that the SCC is in FR2 (mmWave frequency above 24.250 GHZ). The CSSFs for the PCC and the PSCC (as well as Notes 1-5) are similar to those discussed above with respect to Table 400. As such, a discussion of these features will be omitted here for clarity.

In each FR2 band, the UE 110 and the network 100 (e.g., via the gNB 120a,b) would select one FR2 SCC where neighbor cell measurement (NCM) is required, as indicated in Notes 6 and 7. As indicated above, one of the UE's searchers will always be dedicated to PCC MO measurements and the second of the UE's searchers will be shared between PSCC MO, SCC MO, and inter-frequency MO with no measurement gap measurements, with half of the second searcher dedicated to the PSCC MO measurements (every other monitoring occasion) (50% of the time). Half of the remaining half (25%) of the second searcher is dedicated to FR2 SCC MOs where NCM is required. The remaining 25% of the second searcher is shared between the remaining FR2 SCCs where NCM is not required and the inter-frequency MO with no measurement gap.

The CSSF outside of the measurement gap for FR2 SCCs where NCM is required is defined as four times the number of MOS configured for these FR2 SCCs, which is indicated as $4\times(N_{SCC\_SB\_FR2\_NCM}+2\times N_{SCC\_CSIRS\_FR2\_NCM})$. The remaining configured FR2 SCCs do not require NCM. Note 6 further indicates that $N_{SCC\_CSIRS\_FR2\_NCM}$ is defined as the number of configured FR2 SCCs where NCM is required and has either both SSB and CSI-RS MOS configured or only CSI-RS MOs configured. Note 7 further indicates that $N_{SCC\_SSB\_FR2\_NCM}$ is defined as the number of configured FR2 SCCs where NCM is required and only has an SSB-based L3 MO configured.

The CSSF outside of the measurement gap for FR2 SCC where NCM is not required is defined as four times the number of MOs configured for FR2 SCCs where NCM is not required and the MO configured for the inter-frequency layer without measurement gap on any FR2 SCC without NCM, which is indicated as $4\times((N_{SCC\_SSB}-N_{SCC\_SSB\_FR2\_NCM})+Y+2\times(N_{SCC\_CSIRS}-N_{SCC\_CSIRS\_FR2\_NCM}))$. The CSSF outside of the measurement gap for the inter-frequency MO without measurement gap is four times the number of MOs configured for FR2 SCCs where NCM is not required and the MO configured for the inter-frequency layer without measurement gap on any inter-frequency layer, which is also indicated as $4\times((N_{SCC\_SSB}-N_{SCC\_SSB\_FR2\_NCM})+Y+2\times(N_{SCC\_CSIRS}-N_{SCC\_CSIRS\_FR2\_NCM}))$. As indicated in Note 8, $N_{SCC\_SSB}$ indicates the number of configured SCCs having only an SSB-based L3MO configured. Note 9 explains that in the absence of any configured SCCs but with configured inter-frequency MOs without measurement gap on the PCC and/or the PSCC, the second half of the second searcher may be dedicated to the inter-frequency MO without measurement gap.

In some embodiments, there may be no FR2 SCCs where NCM is not required nor inter-frequency MO with no measurement gap configured. In such a scenario, as indicated above, one of the UE's searchers will always be dedicated to PCC MO measurements and the second of the UE's searchers will be shared between PSCC MO, SCC MO, and inter-frequency MO with no measurement gap measurements, with half of the second searcher dedicated to the PSCC MO measurements (every other monitoring occasion) (50% of the time). In this scenario, however, half of the second searcher is dedicated to FR2 SCC MOs where NCM is required (50%). As such, there are no CSSFs for FR2 SCC where NCM is not required nor the inter-frequency MO without measurement gap. This results in a CSSF outside of the measurement gap for FR2 SCCs where NCM is required that is two times the number of MOs configured for the FR2 SCCs where NCM is required, which is indicated as $2\times(N_{SCC\_SSB\_FR2\_NCM}+2\times N_{SCC\_CSIRS\_FR2\_NCM})$.

FIG. 6 shows a table 600 for determining a CSSF according to various exemplary embodiments. Table 600 assumes that the PCC, the PSCC, and some SCCs are in FR1 (below 7.225 GHz) and that other SCCs are in FR2 (mmWave frequency above 24.250 GHz). The CSSFs for the PCC and the PSCC (as well as Notes 1-7 and 9) are similar to those discussed above with respect to Table 500. As such, a discussion of these features will be omitted here for clarity.

The difference between Table 500 and Table 600 is the addition of one or more FR1 SCCs. As indicated above, one of the UE's searchers will always be dedicated to PCC MO measurements and the second of the UE's searchers will be shared between PSCC MO, SCC MO, and inter-frequency MO with no measurement gap measurements, with half of the second searcher dedicated to the PSCC MO measurements (every other monitoring occasion) (50% of the time). Half of the remaining half (25%) of the second searcher is dedicated to FR2 SCC MOs where NCM is required. The remaining 25% of the second searcher is shared among the FR1 SCCs, the remaining FR2 SCCs where NCM is not required, and the inter-frequency MO with no measurement gap.

The only additional CSSF provided by Table 600 compared to Table 500 is the CSSF outside of the measurement gap for FR1 SCC, which is defined as four times the number of MOs configured for FR2 SCCs where NCM is not required and the MO configured for the inter-frequency layer without measurement gap on any FR1 SCC, which is indicated as $4\times((N_{SCC\_SSB}-N_{SCC\_SSB\_FR2\_NCM})+Y+2\times(N_{SCC\_CSIRS}-N_{SCC\_CSIRS\_FR2\_NCM}))$. As indicated in Note 8, here, $N_{SCC\_SSB}$ includes both FR1 and FR2 SCCs.

Returning to FIG. 3, after the CSSF for each CC has been determined, the UE 110 performs the measurements on the MOs based on the CSSF-scaled measurement period at 320.

Figure 7:
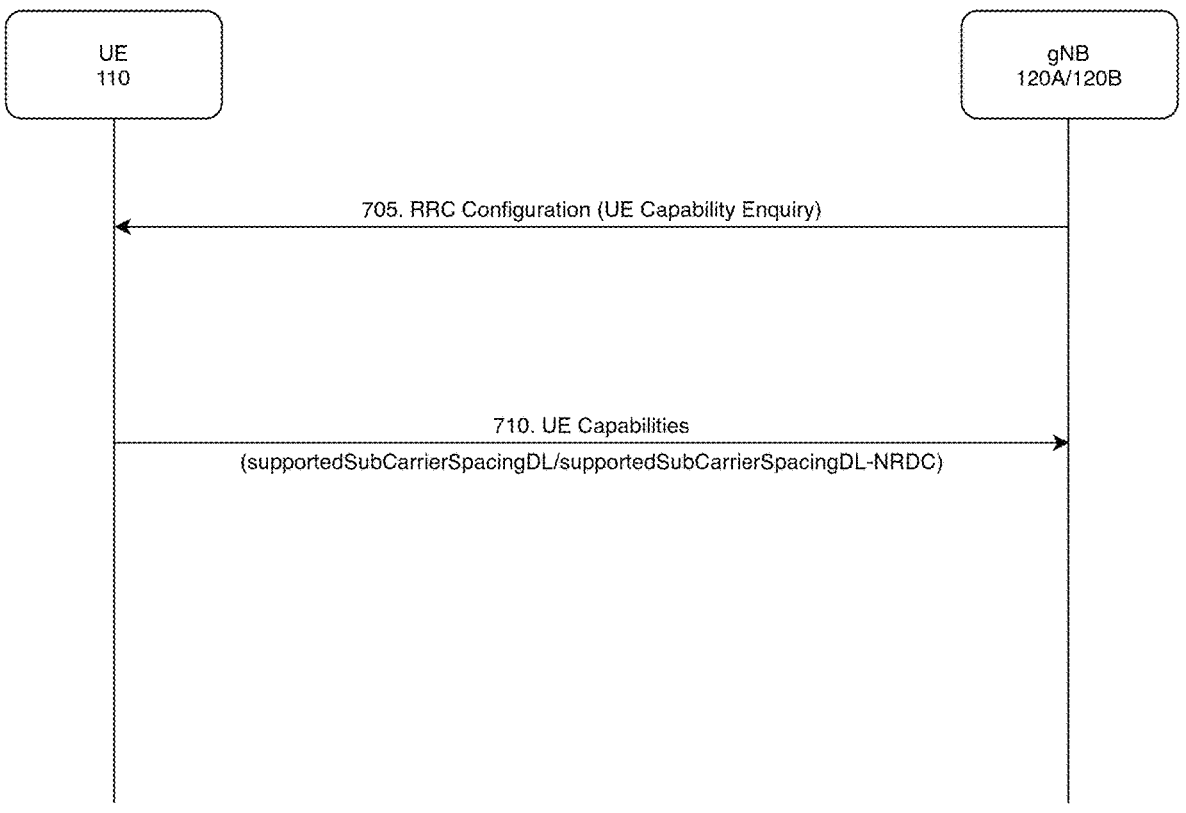
FIG. 7 shows a signaling diagram illustrating reporting of a UE's numerology capability according to various exemplary embodiments.

FIG. 7 shows a signaling diagram illustrating reporting of a UE's numerology capability according to various exemplary embodiments. Current 3GPP standards do not provide a means for the UE 110 to provide its capability of supporting mixed numerology in NR-DC when both the PCC and PSCC are in FR1. Instead, the current standards only provide a means for providing this UE capability to the network when the PCC is in FR1 and the PSCC is in FR2. At 705, the gNB 120A (or 120B) transmits a radio resource configuration (RRC) request to the UE 110 along with a UE capability enquiry. At 710, the UE 110 transmits its capabilities to the gNB 120A. In some embodiments, the UE 110 transmits mixed numerology support as part of its capabilities. In some embodiments, this may be facilitated by expanding the existing "supportedSubCarrierSpacingDL" signaling. In some embodiments, new signaling such as, for example, "supportedSubCarrierSpacingDL-NRDC" may alternatively be utilized.

In some embodiments, the "supportedSubCarrierSpacingDL" signaling may be defined as the supported subcarrier spacing for DL by the UE, indicating the UE supports simultaneous reception with same or different numerologies in CA and FR1+FR1 NR-DC. Support of simultaneous reception with same numerology for intra-band NR CA including both contiguous and non-contiguous is mandatory with capability in both FR1 and FR2. Support of simultaneous reception with two different numerologies between FR1 band(s) and FR2 band(s) in DL is mandatory with capability if UE supports inter-band NR CA including both FR1 band(s) and FR2 band(s). Optional for other cases. Support of simultaneous reception with different numerologies in CA and FR1+FR1 NR-DC for other cases is optional.

In some embodiments, the "supportedSubCarrierSpacingDL" signaling may alternatively be defined as the supported sub-carrier spacing for DL by the UE, indicating the UE supports simultaneous reception with same or different numerologies in CA and FR1+FR1 NR-DC. Support of simultaneous reception with same numerology for intra-band NR CA including both contiguous and non-contiguous is mandatory with capability in both FR1 and FR2. Support of simultaneous reception with two different numerologies between FR1 band(s) and FR2 band(s) in DL is mandatory with capability if UE supports inter-band NR CA including both FR1 band(s) and FR2 band(s). Support of simultaneous reception with two different numerologies between FR1 band and FR1 band in different NR-DC CGs is mandatory with capability if UE supports FR1+FR1 NR-DC including these two bands. Optional for other cases. Support of simultaneous reception with different numerologies in CA for other cases is optional.

In some embodiments, the UE 110 may communicate its capability of handling mixed numerology via "supportedSubCarrierSpacingDL-NRDC" signaling, which is defined as the supported sub-carrier spacing for DL by the UE, indicating the UE supports simultaneous reception with same or different numerologies in NR-DC. Support of simultaneous reception with two different numerologies in the FR1 band in different NR-DC CGs is mandatory with capability if UE supports FR1+FR1 NR-DC including these two bands. Optional for other cases.

In some embodiments, the "supportedSubCarrierSpacingDL-NRDC" signaling may alternatively be defined as the supported sub-carrier spacing for DL by the UE, indicating the UE supports simultaneous reception with same or different numerologies in NR-DC. Support of simultaneous reception with two different numerologies between FR1 band and FR2 band in different NR-DC CGs is mandatory with capability if UE supports FR1+FR2 NR-DC including these two bands. Support of simultaneous reception with two different numerologies between FR1 band and FR1 band in different NR-DC CGs is mandatory with capability if UE supports FR1+FR1 NR-DC including these two bands. Optional for other cases.

In some embodiments, no signaling is necessary. In such an embodiments, it is understood by the UE 110 and the network 100 that supporting of simultaneous reception with two different numerologies between the FR1 band in different NR-DC CGs is mandatory with capability if the UE 110 supports FR1+FR1 NR-DC including these two bands.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above-described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. An apparatus comprising processing circuitry configured to:
  process, based on signaling received from a network, a component carrier (CC) configuration for a New Radio-Dual Connectivity (NR-DC) operating scenario with a primary cell (PCell) serving as a primary CC (PCC) operating in FRI and a primary secondary cell (PSCell) serving as a primary secondary CC (PSCC) operating in FR1;
  process, based on signaling received from the network, a PCC measurement object (MO) configuration;
  process, based on signaling received from the network, a PSCC MO configuration;

determine a PCC carrier specific scaling factor (CSSF) outside of a measurement gap for the PCC based on a number of MOs configured for the PCC, wherein the PCC CSSF outside of the measurement gap for the PCC is specific to the NR-DC operating scenario with the PCell serving as the PCC operating in FRI and the PSCell serving as the PSCC operating in FR1; and
  determine a PSCC CSSF outside of a measurement gap for the PSCC based on a number of MOs configured for the PSCC.

2. The apparatus of claim 1, wherein the PCC CSSF is 1+a number of Channel State Information Reference Signals (CSI-RS) ($1+N_{PCC\_CSIRS}$) configured for the PCC.

3. The apparatus of claim 2, wherein the PCC CSSF is 1 when NPCC_CSIRS is 0.

4. The apparatus of claim 2, wherein $N_{PCC\_CSIRS}$ is 1 when either (i) a Synchronization Signal Block (SSB) and a CSI-RS based layer 3 (L3) measurements are configured for the PCC or (ii) only the CSI-RS based L3 measurement is configured for the PCC, wherein the PCC CSSF is 2.

5. The apparatus of claim 1, wherein the PSCC CSSF is two times 1+a number of Channel State Information Reference Signals (CSI-RS) ($2\times(1+N_{PSCC\_CSIRS})$) configured for the PSCC.

6. The apparatus of claim 5, wherein the PSCC CSSF is 2 when $N_{PSCC\_CSIRS}$ is 0.

7. The apparatus of claim 5, wherein $N_{PSCC\_CSIRS}$ is 1 when either (i) a Synchronization Signal Block (SSB) and a CSI-RS based layer 3 (L3) measurements are configured for the PSCC or (ii) only the CSI-RS based L3 measurement is configured for the PSCC, wherein the PCC CSSF is 4.

8. The apparatus of claim 5, wherein if no secondary component carriers (SCCs) are configured and no inter-frequency MO without measurement gap is configured, then the PSCC CSSF outside of the measurement gap is equal to 1.

9. The apparatus of claim 1, wherein the processing circuitry is further configured to:
  process, based on signals received from a network, a secondary component carrier (SCC) measurement object (MO) configuration, wherein a secondary cell (SCell) serving the SCC is operating in frequency range 1 (FR1); and
  determine a SCC carrier specific scaling factor (CSSF) outside of a measurement gap for the SCC based on a number of MOs configured for the SCC.

10. The apparatus of claim 9, wherein the SCC CSSF outside of the measurement gap for the SCC is two times a number of MOs on all configured SCCs ($N_{SCC\_SSB}$ and $N_{SCC\_CSIRS}$) and on an inter-frequency layer without measurement gap on any SCC (Y), which is $2\times(N_{SCC\_SSB}+Y+2\times N_{SCC\_CSIRS})$.

11. The apparatus of claim 9, wherein the SCC CSSF outside of the measurement gap for a configured inter-frequency MO with no measurement gap is two times a number of MOs on all configured SCCs ($N_{SCC\_SSB}$ and $N_{SCC\_CSIRS}$) and on an inter-frequency layer without measurement gap on any SCC (Y), which is $2\times(N_{SCC\_SSB}+Y+2\times N_{SCC\_CSIRS})$.

12. A user equipment (UE) comprising:
  a transceiver configured to communicate with a network; and
  processing circuitry communicatively coupled to the transceiver and configured to:
  process, based on signaling received from a network, a component carrier (CC) configuration for a New Radio-Dual Connectivity (NR-DC) operating scenario with a primary cell (PCell) serving as a primary CC (PCC) operating in FRI and a primary secondary cell (PSCell) serving as a primary secondary CC (PSCC) operating in FR1;

process, based on signaling received from the network, a PCC measurement object (MO) configuration;

process, based on signaling received from the network, a PSCC MO configuration;

determine a PCC carrier specific scaling factor (CSSF) outside of a measurement gap for the PCC based on a number of MOs configured for the PCC, wherein the PCC CSSF outside of the measurement gap for the PCC is specific to the NR-DC operating scenario with the PCell serving as the PCC operating in FRI and the PSCell serving as the PSCC operating in FR1; and determine a PSCC CSSF outside of a measurement gap for the PSCC based on a number of MOs configured for the PSCC.

13. The UE of claim 12, wherein the PCC CSSF is 1+a number of Channel State Information Reference Signals (CSI-RS) ($1+N_{PCC\_CSIRS}$) configured for the PCC.

14. The UE of claim 13, wherein the PCC CSSF is 1 when $N_{PCC\_CSIRS}$ is 0.

15. The UE of claim 13, wherein $N_{PCC\_CSIRS}$ is 1 when either (i) a Synchronization Signal Block (SSB) and a CSI-RS based layer 3 (L3) measurements are configured for the PCC or (ii) only the CSI-RS based L3 measurement is configured for the PCC, wherein the PCC CSSF is 2.

16. The UE of claim 12, wherein the PSCC CSSF is two times 1+a number of Channel State Information Reference Signals (CSI-RS) ($2\times(1+N_{PSCC\_CSIRS})$) configured for the PSCC.

17. The UE of claim 16, wherein the PSCC CSSF is 2 when $N_{PSCC\_CSIRS}$ is 0.

18. The UE of claim 16, wherein $N_{PSCC\_CSIRS}$ is 1 when either (i) a Synchronization Signal Block (SSB) and a CSI-RS based layer 3 (L3) measurements are configured for the PSCC or (ii) only the CSI-RS based L3 measurement is configured for the PSCC, wherein the PCC CSSF is 4.

19. The UE of claim 16, wherein if no secondary component carriers (SCCs) are configured and no inter-frequency MO without measurement gap is configured, then the PSCC CSSF outside of the measurement gap is equal to 1.

20. The UE of claim 12, wherein the processing circuitry is further configured to:

process, based on signals received from a network, a secondary component carrier (SCC) measurement object (MO) configuration, wherein a secondary cell (SCell) serving the SCC is operating in frequency range 1 (FR1); and determine a SCC carrier specific scaling factor (CSSF) outside of a measurement gap for the SCC based on a number of MOs configured for the SCC, wherein the SCC CSSF outside of the measurement gap for the SCC and the SCC CSSF outside of the measurement gap for a configured inter-frequency MO with no measurement gap is two times a number of MOs on all configured SCCs ($N_{SCC\_SSB}$ and $N_{SCC\_CSIRS}$) and on an inter-frequency layer without measurement gap on any SCC (Y), which is $2\times(N_{SCC\_SSB}+Y+2\times N_{SCC\_CSIRS})$.

* * * * *